United States Patent
Ezekiel (10) Patent No.: US 9,676,125 B2
(45) Date of Patent: Jun. 13, 2017

(54) METHOD OF CAST MOULDING A TRANSLATING MULTIFOCAL CONTACT LENS

(75) Inventor: Donald Frederick Ezekiel, North Fremantle (AU)

(73) Assignee: EZEKIEL NOMINEES PTY LTD, North Fremantle (AU)

(*) Notice: Subject to any disclaimer, the term of this patent is extended or adjusted under 35 U.S.C. 154(b) by 590 days.

(21) Appl. No.: 14/375,104

(22) PCT Filed: Aug. 10, 2012

(86) PCT No.: PCT/US2012/000948
§ 371 (c)(1),
(2), (4) Date: Jul. 28, 2014

(87) PCT Pub. No.: WO2013/033752
PCT Pub. Date: Mar. 14, 2013

(65) Prior Publication Data
US 2015/0084218 A1    Mar. 26, 2015

(51) Int. Cl.
*B29C 39/02* (2006.01)
*G02C 7/04* (2006.01)
*B29D 11/00* (2006.01)

(52) U.S. Cl.
CPC ...... *B29C 39/026* (2013.01); *B29D 11/00028* (2013.01); *B29D 11/00038* (2013.01); *B29D 11/0048* (2013.01); *G02C 7/043* (2013.01); *G02C 7/045* (2013.01)

(58) Field of Classification Search
CPC ............ B29C 39/026; B29D 11/00038; B29D 11/0048
See application file for complete search history.

(56) References Cited

U.S. PATENT DOCUMENTS

| 5,517,259 A | 5/1996 | Blum et al. |
| 5,611,970 A | 3/1997 | Apollonio et al. |
| 5,861,114 A | 1/1999 | Roffman et al. |
| 2004/0075807 A1 | 4/2004 | Ho et al. |

(Continued)

FOREIGN PATENT DOCUMENTS

| AU | 769719 B2 | 6/2001 |
| CN | 1856729 A | 11/2006 |

(Continued)

OTHER PUBLICATIONS

International Search Report and Written Opinion for PCT/AU2012/000948 dated Aug. 28, 2012.

(Continued)

*Primary Examiner* — James Sanders
(74) *Attorney, Agent, or Firm* — Moore & Van Allen PLLC; Henry B. Ward, III (57) ABSTRACT

There is provided a contact lens (60) which is produced by cast molding. The cast molding is achieved by the use of an anterior face mold insert (30) which has a cap (24) with a domed surface (26) and a body (10). The domed surface has provision for a distance vision segment (31) and a reading segment (32) separated by a demarcation (33). Further, the cap (24) has a cutaway portion (20) for producing a lower ledge and the body (10) has a projection (18) for producing a lower truncation in the resultant lens. Means is also described for forming a posterior face of the contact lens (60).

6 Claims, 6 Drawing Sheets

(56) References Cited

U.S. PATENT DOCUMENTS

2004/0263776 A1  12/2004  Ezekiel

FOREIGN PATENT DOCUMENTS

EP    2031432 B1   3/2009
WO    0142002 A1   6/2001

OTHER PUBLICATIONS

International Preliminary Report on Patentability (IPRP) with amended pages for PCT/AU2012/000948 dated Dec. 13, 2013.
URL: http://web.archive.org/web/20110623171010/http://www.al-laboutvision.com/contacts/bifocals/htm publised on Jun. 23, 2011 as per Wayback Engine.
URL: http://web.archive.org/web/20110811120615/http://www.contactlenses.org/bifocal_contact_lenses.htm published on Aug. 11, 2011 as per Wayback Engine.
'Clinical Contact Lens Practice' Edward S. Bennett, Barry A. Weissman, Lippincott Williams and Wilkins 2005 Medical p. 204.
URL: http://www.siliconehydrogels.org/editorials/previous_editorial_jackie_tan.asp Published Feb. 11, 2011 as per Wayback Engine.
European Search Report and Written Opinion for EP Application No. 12830565.3 dated Mar. 26, 2015.

METHOD OF CAST MOULDING A TRANSLATING MULTIFOCAL CONTACT LENS

TECHNICAL FIELD

The present invention relates to a method of cast moulding a translating multifocal contact lens.

BACKGROUND OF THE INVENTION

In Australian Patent Number 769719 there is described and claimed a multifocal contact lens wherein the contact lens is made of flexible material and the contact lens is arranged to translate on an eye.

The entire disclosure of Australian Patent Number 769719 is incorporated herein by reference.

The present invention provides a means of manufacturing a lens of the type described in Australian Patent Number 769719.

SUMMARY OF THE INVENTION

In accordance with one aspect of the present invention there is provided a method of cast moulding a multifocal translating contact lens which comprises producing a first mould insert having a surface which is used to produce a first mould having an internal face and a second mould insert having a surface which is used to produce a second mould having an external face, wherein the first mould represents a shape of an anterior face of a contact lens and the second mould represents a shape of a posterior face of a contact lens, wherein the first and second moulds are brought together with the external face of the second mould juxtaposed with the internal face of the first mould so as to define a volume therebetween, the volume between the first and second juxtaposed moulds being filled with contact lens material, allowing the contact lens volume in the moulds to cure to produce the cast moulded contact lens, wherein the volume defined by the first and second moulds is configured so as to form a contact lens with a lower truncation.

Preferably, the volume defined by the first and second juxtaposed moulds also has an internal configuration which produces a forwardly projecting ledge at a lower end of the cast moulded contact lens.

More preferably, the internal face of the first mould produces an anterior face of the cast moulded contact lens with distance and close range vision segments. The resultant cast moulded contact lens preferably has an anterior face with an upper distance vision segment and a lower close range vision segment.

BRIEF DESCRIPTION OF THE DRAWINGS

The present invention will now be described with reference to the accompanying drawings, in which:

FIG. 6 is a plan view of the moulding member of FIG. 4;

DESCRIPTION OF THE INVENTION

Figures 4, 5, 7:
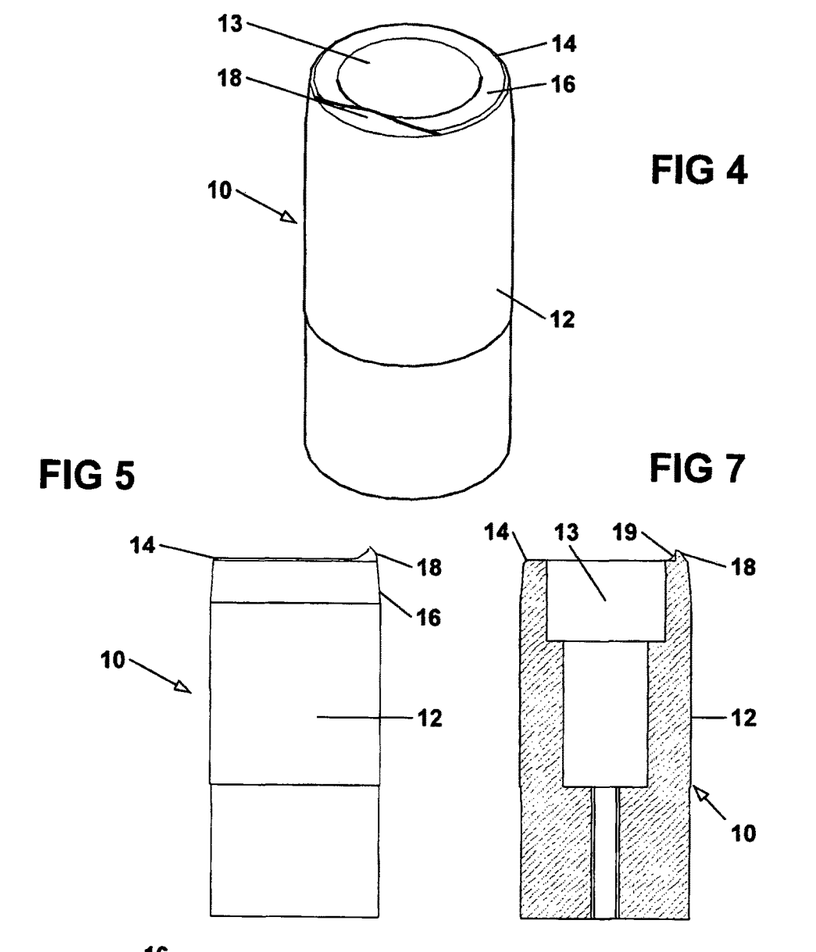
FIG. 4 is a perspective view of a second moulding member for use in the method of the present invention.
FIG. 5 is a side elevation of the moulding member of FIG. 4.
FIG. 7 is a vertical sectional view of the moulding member of FIG. 4 along the line 7-7 of FIG. 6.

In FIGS. 4 to 7 of the accompanying drawings there is shown a first moulding member 10 comprising a cylindrical body 12 having an internal recess 13 with an open upper end 14 as shown. The upper end 14 comprises a rim 16 which is provided with an upstanding projection 18. As can be seen in FIG. 7 the projection 18 has a flat central inner face portion 19.

Figure 1:
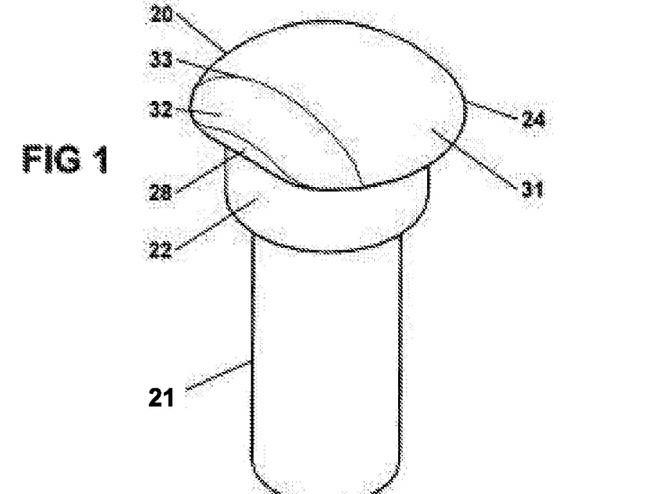
FIG. 1 is a perspective view of a first moulding member for use in the method of the present invention.
Figure 2:
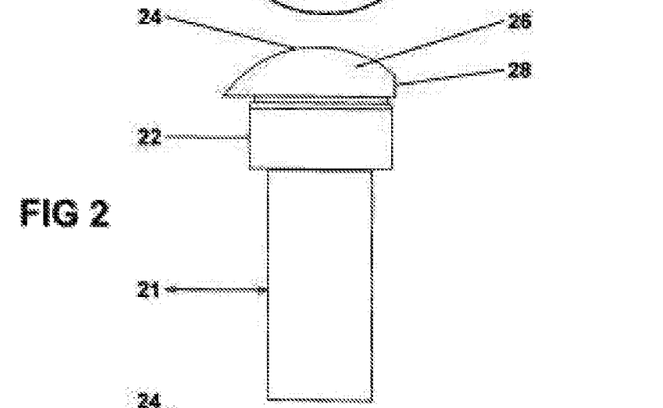
FIG. 2 is a side elevation of the moulding member of FIG. 1.
Figure 3:
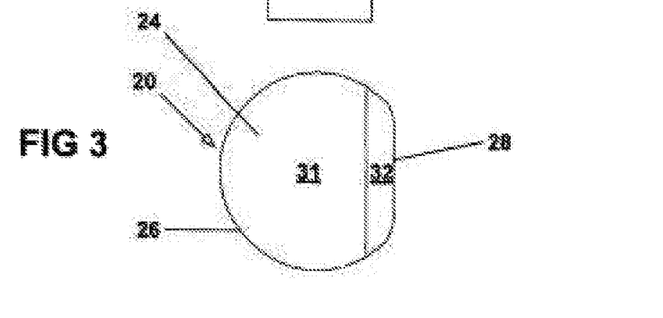
FIG. 3 is a plan view of the moulding member of FIG. 1.

In FIGS. 1 to 3 of the accompanying drawings there is shown a second moulding member 20 having a rod 21 arranged to engage with the recess 13. The rod 21 is provided with an upper enlarged cylindrical portion 22 which is arranged to fit snugly in an upper end of the recess 13 (see FIG. 7) so that the moulding member 20 is, in use, engaged with the moulding member 10 in a stable manner so as to be a seamless part of a single insert.

The member 20 is also provided with a cap 24 which is generally circular in plan view as shown in FIG. 3. The cap 24 has an outer domed end surface 26 as best seen in FIG. 2 incorporating surface curves for distance vision 31 and close range vision 32 lens prescriptions separated by a demarcation line 33. Further the cap 24 has a cut away portion 28 on one side as shown. The positioning of the distance vision 31 and close range vision 32 areas of the surface 26 may be varied depending on the areas of 31 and 32 required.

Figure 8:
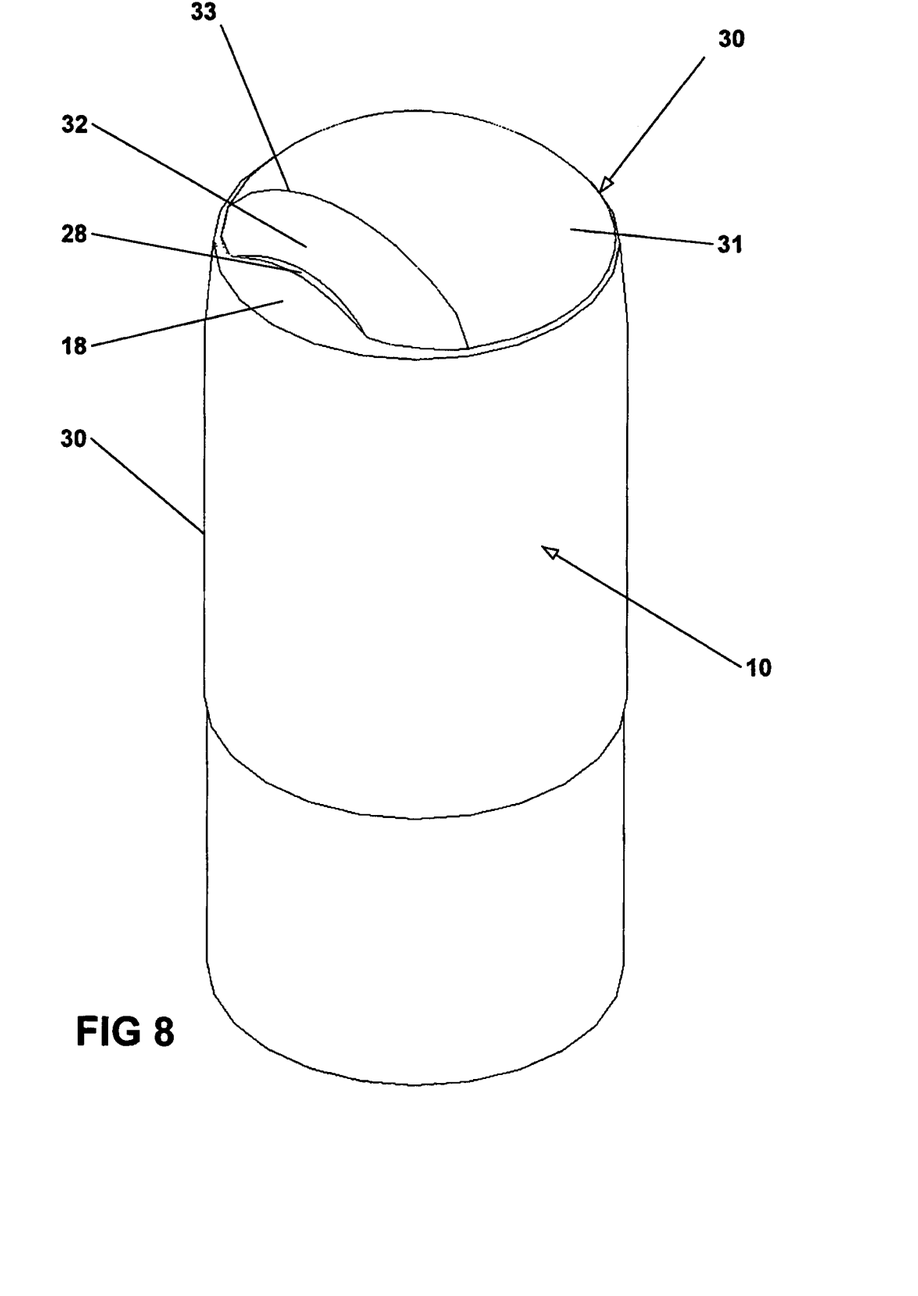
FIG. 8 is a perspective elevation of a mould insert formed from the moulding members of FIGS. 1 and 4 for forming an anterior face of a contact lens.

The moulding members 10 and 20 are arranged to be joined together as shown in FIG. 8 by inserting the rod 21 into the recess 13 until the portion 22 engages with the upper end of the recess 13 and until the cap 24 engages with the rim 16. In this position the cut away portion 28 is contiguous with and in alignment with the inner face 19 of the upstanding projection 18.

In FIG. 8, there is shown a resultant two part mould insert 30. The upper end 14 of the cylindrical body 12 of the moulding member 10 with the rim 16 having the upstanding projection 18 is a first component of the mould insert 30. The cap 24 of the moulding member 20 is the second component of the mould insert 30.

The mould insert 30 is arranged to produce a mould for an anterior face of a contact lens of the type described in Australia Patent Number 769719 referred to hereinabove. This may be done by any convenient means such as by injection moulding.

In particular, the upstanding projection 18 on the rim 16 is designed to produce a lower truncation in the moulded lens. Further, the cut away portion 28 is arranged to produce a lower forwardly projecting ledge in the moulded lens. As shown in FIG. 8, in the mould insert 30, the cut away portion 28 engages with the projection 18 as indicated hereinbefore. The domed surface 26 has a first curve representing an upper distance vision segment 31 and a second curve representing a lower reading power segment 32.

As described in Australian Patent Number 769719 the truncation and the forwardly projecting ledge are arranged to engage with a lower eyelid of a user to facilitate translation.

Figure 9:
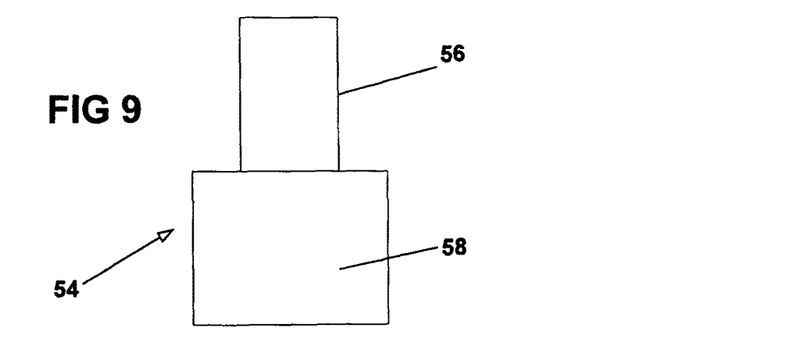
FIG. 9 is a side elevation of a mould insert for forming a posterior face of a contact lens.
Figure 10:
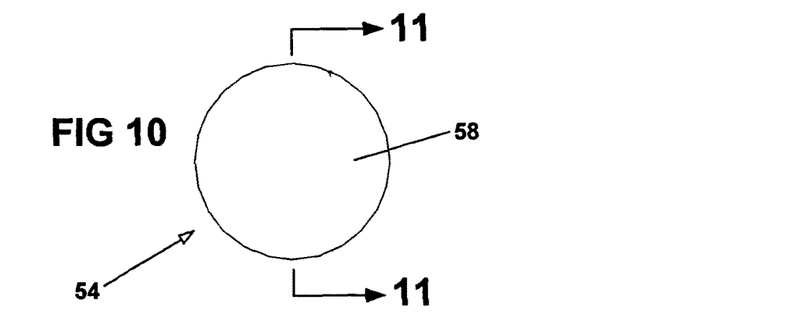
FIG. 10 is an underneath view of the mould insert of FIG. 9.
Figure 11:
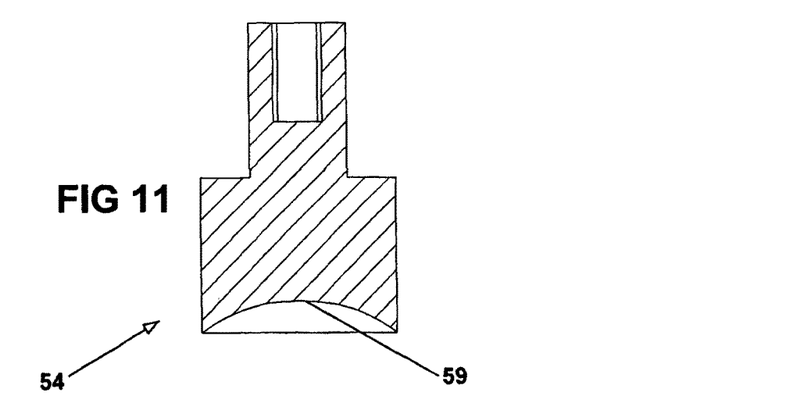
FIG. 11 is a vertical section along the line 11-11 of FIG. 10

To form a posterior face in a moulded contact lens it is simply necessary to produce a mould insert with a standard curvature. This incorporates the lens base curve that is necessary to fit an eye and may be spherical, toroidal or aspheric in shape or it may be a combination of curves. The posterior surface may also comprise a peripheral design (not shown) in known manner to facilitate translation when the ledge engages with a lower eyelid in looking down. A typical mould insert 54 for the posterior face is shown in FIGS. 9 to 11. The mould insert 54 comprises a rod 56 for mounting in an injection moulding machine. Further, there is provided a generally circular moulding member 58. The member 58 has an interior with a curved surface 59 which conforms to the desired curvature of the posterior face of the resultant contact lens.

The mould inserts 30 and 54 may be produced by any convenient method but the use of a precision computer-controllable manufacturing lathe to produce the moulding tools is preferred. This device is used to lathe the components of the mould inserts 30 and 54 to the precise specifications needed to produce a mould surface which is then replicated on the anterior and posterior surface of the lens with the required curvature. Further, the mould insert 30 is configured to produce simultaneously the truncation and the forwardly projecting ledge.

The mould insert 30 is preferably made in two parts as described but it can be made in one part if desired. However, producing it in two parts has the advantage that the domed surface 26 containing the power curvatures for the anterior surface is formed separately so as to customise the curvature to suit the different power needs without the need to be concerned about formation of the truncation with each moulding member 10.

Figure 12:
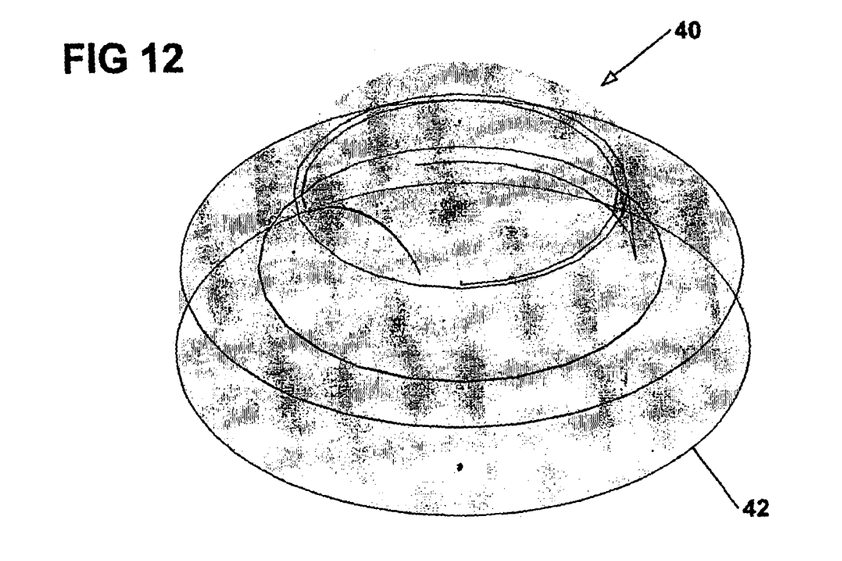
FIG. 12 is a perspective view of a mould formed from the mould insert of FIG. 8.

An anterior face contact lens mould may be manufactured using the mould insert 30 of the present invention by using the mould insert 30 to form a plastics material or glass mould 40 or the like for the front face of a lens as shown in FIG. 12 in known manner such as by injection moulding.

Figure 13:
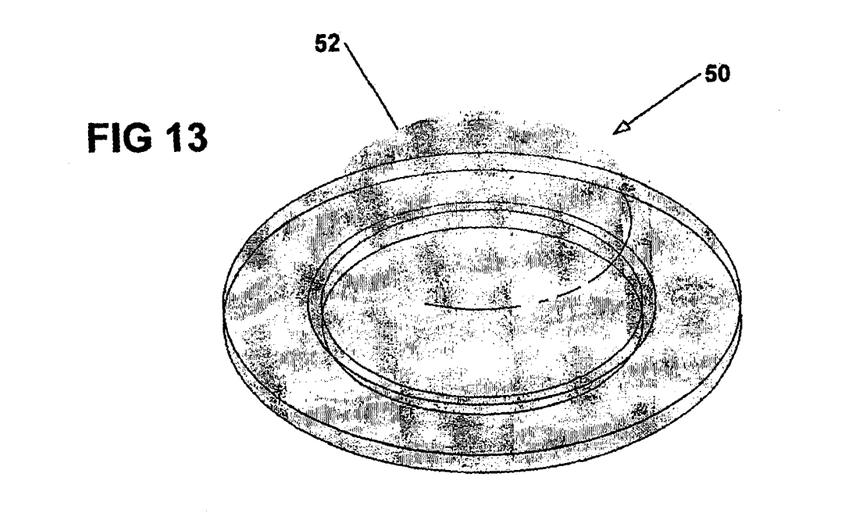
FIG. 13 is a perspective view of a mould formed from the mould insert of FIG. 9.

Similarly, a contact lens mould 50 as shown in FIG. 13 for the posterior face of a lens may be formed from a moulding material by means of a rear surface moulding tool shown in FIGS. 9 to 11 in known manner such as by injection moulding.

Figure 14:
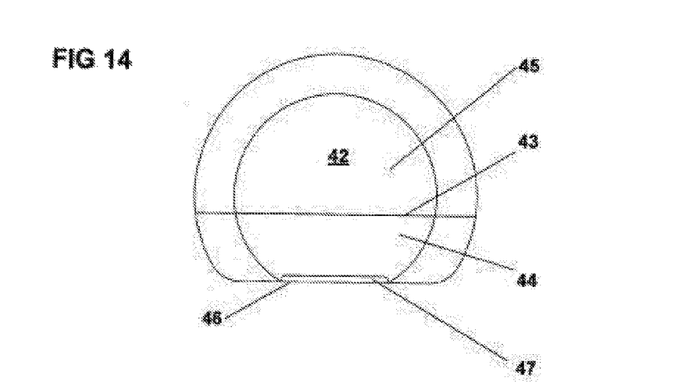
FIG. 14 is a plan view of an interior of the mould of FIG. 12.

In FIG. 14 there is shown the internal face 42 of the mould 40 produced from the mould insert 30 as described hereinabove. It can be seen that the internal face has a demarcation 43 between a lower reading vision segment 44 and upper distance vision segment 45. Further the internal face 42 has a provision 46 for the ledge and also a provision 47 for the truncation.

Figure 15:
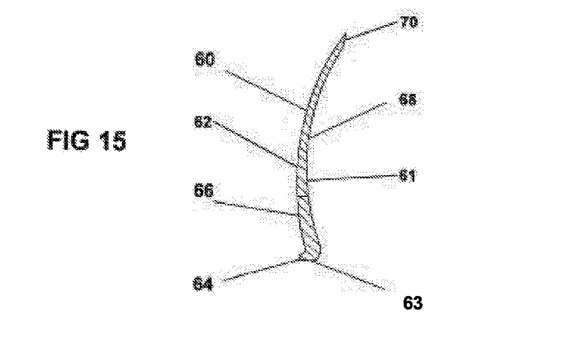
FIG. 15 is a side elevation of a contact lens produced by the method of the present invention.

A typical contact lens 60 cast moulded by the method of the present invention is shown in FIG. 15 showing a posterior face 61 and an anterior face 62. There is also shown a lower truncation 63, a forwardly projecting ledge 64 and the close and distance vision segments 66 and 68 respectively. It is found that the ledge 64 adds bulk to the lower end of the lens 60 so allowing good lid action on the contact lens 60 and the truncation 62 provides a relatively wide surface for resting on a lower eyelid. Further, an upper end of the posterior face 61 is provided with a peripheral lenticulation 70 to facilitate translocation of the lens 60 on the eye.

To cast mould a contact lens in accordance with the present invention to the design as described in Australian Patent number 769719 referred to hereinabove, as shown in FIG. 14, lens material may applied such as by injection, onto a surface of one mould 40 or 50 and an opposing surface of the other mould 40 or 50 may then be placed on to the first mentioned surface. The volume defined between the two juxtaposed surfaces provides the design and thickness in all the lens parameters of the lens required. For example material may be placed on an internal surface 42 of the mould 40 and an external surface 52 of the mould 50 may be engaged with the surface 42 of the mould 40.

The material is then subjected to curing in known manner to achieve polymerisation. The mould is then opened and the resulting lens removed.

Further, in addition to lower reading vision and upper distance vision portions the) anterior face of the lens may be provided with an intermediate vision portion or a progressive close portion. Also, the resulting lens may be provided with peripheral lenticulated portions in known manner to reduce bulk.

Modifications and variations such as would be apparent to a skilled addressee are deemed to be within the scope of the present invention.

The invention claimed is:

1. A method of cast moulding an alternating vision multifocal contact lens made of flexible material, the method comprising:

providing a first mould insert having a surface which is used to produce a first mould having an internal surface, wherein the first mould insert comprises:
a first part defining an upstanding projection for configuring a multifocal contact lens so as to produce a lower truncation in the multifocal contact lens;
a second part defining a domed surface for configuring the multifocal contact lens so as to produce bifocal lens powers of the multifocal contact lens, wherein the second part comprises a cut away portion corresponding to the configuration of the upstanding projection, configured for producing a lower forwardly projecting ledge in the multifocal contact lens;
wherein the first part is configured to engage with the second part to form the first mould insert;

providing a second mould insert having a surface which is used to produce a second mould having an external surface;

forming the first mould using the first mould insert, wherein the first mould has the internal surface for forming an anterior face of the multifocal contact lens, wherein the surface of the first mould comprises:
a domed surface corresponding to the domed surface of the first mould insert that configures the multifocal contact lens to produce the bifocal lens powers of the multifocal contact lens; and
a raised portion and a depression corresponding to the cut away portion and the upstanding projection of the first mould insert that configure the multifocal contact lens to produce the lower truncation and the lower forwardly projecting ledge of the multifocal contact lens;

forming the second mould using the second mould insert, wherein the second mould has the external surface for forming a posterior face of a contact lens; and forming the multifocal contact lens, comprising:
  positioning the first and second moulds adjacent one another such that the internal surface of the first mould is juxtaposed with the external surface of the second mould so as to define a volume therebetween;
  filling the volume between the first and second juxtaposed moulds with contact lens material, wherein the domed surface of the first mould configures the multifocal contact lens to produce the bifocal lens powers and the raised portion and the depression of the first mould configure the multifocal contact lens to produce the truncation and the forwardly projecting ledge; and
  allowing the multifocal contact lens material in the volume to cure to produce the multifocal contact lens having the truncation and the forwardly projecting ledge at a lower end thereof.

2. A method according to claim 1, wherein the produced multifocal contact lens has the anterior face with an upper distance vision segment and a lower close range vision segment.

3. A method according claim 1, wherein the multifocal contact lens material is applied onto the internal face of the first mould and/or onto the external face of the second mould and the first and second moulds are subsequently juxtaposed to define the volume for production of the multifocal contact lens filled with contact lens material.

4. The method according to claim 1, wherein the domed surface of the second part comprises a first surface curve configured for producing a first vision range of the multifocal contact lens, and a second surface curve configured for producing a second vision range of the multifocal contact lens.

5. The method according to claim 1, wherein the cut away portion of the second part is configured to engage the upstanding projection of first part to form the first mould insert.

6. The method according to claim 1, wherein:
  the first part comprises a cylindrical body defining an internal recess and an upper rim, wherein the upstanding projection extends from the upper rim; and
  the second part comprises a rod having an enlarged portion at one end, wherein the enlarged portion comprises the surface dome and the cutaway portion;
  wherein coupling the rod with the internal recess causes the cut away portion of the second part to engage the upstanding projection of first part.

* * * * *

UNITED STATES PATENT AND TRADEMARK OFFICE
CERTIFICATE OF CORRECTION

| | | |
|---|---|---|
| PATENT NO. | : 9,676,125 B2 | Page 1 of 1 |
| APPLICATION NO. | : 14/375104 | |
| DATED | : June 13, 2017 | |
| INVENTOR(S) | : Donald Frederick Ezekiel | |

It is certified that error appears in the above-identified patent and that said Letters Patent is hereby corrected as shown below:

On the Title Page

Item (86) priority to PCT/AU2012/000948 should be listed, not PCT/US2012/000948.

Signed and Sealed this
First Day of August, 2017

Joseph Matal
*Performing the Functions and Duties of the*
*Under Secretary of Commerce for Intellectual Property and*
*Director of the United States Patent and Trademark Office*